United States Patent
Tang

(10) Patent No.: US 8,406,023 B2
(45) Date of Patent: Mar. 26, 2013

(54) DISCHARGE LOOP FOR POWER SUPPLY CIRCUIT AND ACTIVE CONTROL CIRCUIT THEREOF

(75) Inventor: Pak-Chuen Tang, Hong Kong (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 314 days.

(21) Appl. No.: 13/017,971

(22) Filed: Jan. 31, 2011

(65) Prior Publication Data
US 2012/0008354 A1     Jan. 12, 2012

(30) Foreign Application Priority Data
Jul. 12, 2010  (CN) .......................... 2010 1 0225148

(51) Int. Cl.
*H02M 7/06* (2006.01)
(52) U.S. Cl. .......................................... 363/126; 363/44
(58) Field of Classification Search .................. 363/37, 363/39, 44, 45, 46, 49, 125, 126, 127
See application file for complete search history.

(56) References Cited

U.S. PATENT DOCUMENTS

| 7,859,863 B2 * | 12/2010 | Hsia et al. | 363/126 |
| 2005/0248968 A1 * | 11/2005 | Chang | 363/125 |
| 2010/0309694 A1 * | 12/2010 | Huang et al. | 363/49 |

* cited by examiner

*Primary Examiner* — Nguyen Tran
(74) *Attorney, Agent, or Firm* — Kirton McConkie; Evan R. Witt

(57) ABSTRACT

Provided is a discharge loop for power supply and the active control circuit thereof for actively regulating the discharging operation of the discharge loop of the power supply. The inventive active control circuit is able to disallow the current to flow through the bleeder resistor of the discharge loop to cause power loss when the input power of the power supply is applying, and provide a fast discharge path for the bleeder resistor to expedite the discharging operation when the input power of the power supply is interrupted. Therefore, the inventive active control circuit is able to reduce the power loss of the power supply and enhance the power efficiency of the power supply.

16 Claims, 6 Drawing Sheets

DISCHARGE LOOP FOR POWER SUPPLY CIRCUIT AND ACTIVE CONTROL CIRCUIT THEREOF

FIELD OF THE INVENTION

The present invention relates to a discharge loop for a power supply circuit, and more particularly to an active control circuit for a discharge loop in a power supply circuit.

BACKGROUND OF THE INVENTION

Capacitor is widely known as an indispensable electronic component for the purpose of power filtering and energy storage in power supply circuits, which convert an AC power such as utility power into a DC voltage tailored to power an electric appliance.

Referring to FIG. 1, a discharge loop in a power supply circuit according to the prior art is shown. As shown in FIG. 1, the conventional power supply circuit 1 includes a filtering capacitor C connected in parallel with the input side of the power supply circuit for removing the high-frequency noises of the input AC voltage Vin, thereby reducing the electromagnetic interference induced during the operation phase of the power supply circuit.

Moreover, the safety regulations of electric appliance normally require the electric energy stored in the filtering capacitor C to be rapidly discharged down to 37% of its peak voltage as the power supply circuit is interrupted in receiving the input AC voltage Vin, thereby reducing the risk of suffering from electric shock as a result of the inadvertent contact of the power supply circuit. In order to meet the safety regulations, the conventional power supply circuit of FIG. 1 includes a discharge loop consisted of a bleeder resistor R connected in parallel to the filtering capacitor C for providing a discharge path for the filtering capacitor C. As the power supply circuit is interrupted in receiving the input AC voltage Vin, the voltage of the filtering capacitor C is able to be discharged through the bleeder resistor R within a time period defined by the time constant which is derived from the multiplication the capacitance of the filtering capacitor C by the resistance of the bleeder resistor R, in order to comply with the standard prescribed by the safety regulations.

With the increasing of the power consumption of electric appliances, the capacitance of the filtering capacitor C and the power consumption of the power supply circuit increase as well. This would deflate the power efficiency of the power supply circuit.

Therefore, the invention proposes an active control circuit for a discharge loop in a power supply circuit to reduce the power loss of the discharge loop and enhance the power efficiency of the power supply circuit.

SUMMARY OF THE INVENTION

An object of the invention is to provide a discharge loop for a power supply circuit and an active control circuit thereof. The active control circuit manipulates the discharge loop to reduce the unnecessary power loss incurred with the discharge loop as the power supply circuit is operating with the input AC voltage, and manipulates the discharge loop to rapidly discharge the energy stored in the energy storage element of the power supply circuit as the input AC voltage of the power supply circuit is interrupted.

The major aspect of the invention is attained by providing a discharge loop for a power supply circuit, in which the power supply circuit includes a filtering capacitor connected to an input side of the power supply circuit for removing the electromagnetic interference caused by the input AC voltage. The inventive discharge loop includes: (I) a first bleeder resistor connected to the filtering capacitor for allowing the energy stored in the filtering capacitor to be discharged therethrough as the input AC voltage is interrupted, and (II) an active control circuit connected to the first bleeder resistor and the input side of the power supply circuit for manipulating the discharge loop to discharge the energy of the filtering capacitor through the first bleeder resistor according to the status of the input AC voltage. The active control circuit includes: (I) a switch connected in series with the first bleeder resistor, and (II) a voltage sensing circuit connected to the input side of the power supply circuit and the control terminal of the switch for manipulating the switching operation of the switch. The voltage sensing circuit includes: (I) a differentiator connected to the input side of the power supply circuit for detecting the variation of the input AC voltage, and (II) a half-wave rectifier connected to the differentiator and the control terminal of the switch for performing half-wave rectification to the input AC voltage and generating a half-wave rectified DC voltage accordingly, thereby manipulating the switching operation of the switch.

The minor aspect of the invention is attained by providing an active control circuit for use with a discharge loop of a power supply circuit. The power supply circuit includes a filtering capacitor connected to the input side of the power supply circuit for removing the electromagnetic interference on the input AC voltage of the power supply circuit. The discharge loop includes: (I) a first bleeder resistor connected to the filtering capacitor for allowing the energy stored in the filtering capacitor to be discharged therethrough as the input AC voltage is interrupted. The active control circuit includes: (I) a switch connected in series with the first bleeder resistor, and (II) a voltage sensing circuit connected to the input side of the power supply circuit and the control terminal of the switch for manipulating the switching operation of the switch. The voltage sensing circuit includes: (I) a differentiator connected to the input side of the power supply circuit for detecting the variation of the input AC voltage, and (II) a half-wave rectifier connected to the differentiator and the control terminal of the switch for performing half-wave rectification to the input AC voltage and generating a half-wave rectified DC voltage accordingly, thereby manipulating the switching operation of the switch.

Now the foregoing and other features and advantages of the present invention will be best understood through the following descriptions with reference to the accompanying drawings, wherein:

DESCRIPTION OF THE PREFERRED EMBODIMENT

Several preferred embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 2:
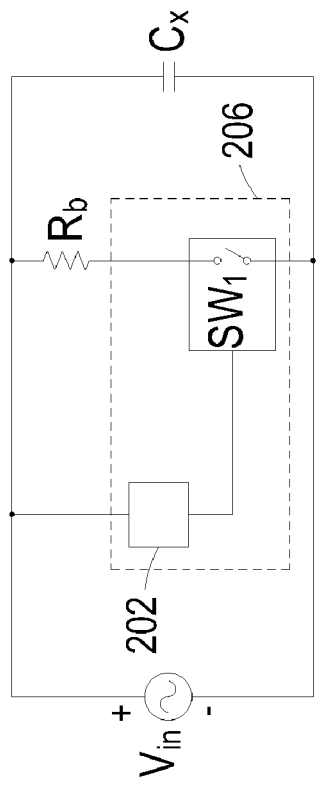
FIG. 2 is a circuit diagram showing a discharge loop in a power supply circuit and an active control circuit thereof according to one embodiment of the invention.
Figure 1:
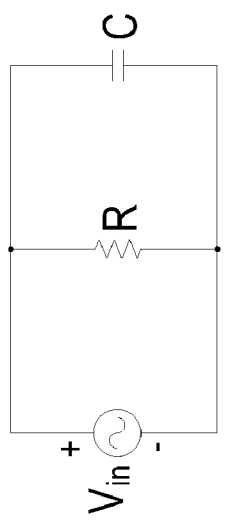
FIG. 1 is a circuit diagram showing a discharge loop in a power supply circuit according to the prior art.

FIG. 2 is a block diagram showing the discharge loop and the active control circuit thereof according to the invention. In FIG. 2, the power supply circuit includes a filtering capacitor Cx connected across the fire line and the neutral line of the input AC voltage Vin. That is, the filtering capacitor Cx is connected in parallel with the input side of the power supply circuit, in which the input AC voltage Vin is provided as the input voltage for the power supply circuit. The discharge loop of the invention includes a voltage sensing circuit 202 connected to the input side of the power supply circuit to detect the presence of the input AC voltage Vin. The discharge loop of the invention further includes a bleeder resistor Rb for providing a discharge path for the filtering capacitor Cx. The functionality of the filtering capacitor Cx and the bleeder resistor Rb is similar to that of the filtering capacitor C and the bleeder resistor R of FIG. 1, and thus it is not intended to give details of the functionality of the filtering capacitor Cx and the bleeder resistor Rb herein. It is noteworthy that the discharge loop of the invention further includes a switch circuit SW1 connected in series with the bleeder resistor Rb and connected to the voltage sensing circuit 202. The switch circuit SW1 is configured to control the discharging operation of the filtering capacitor Cx and the bleeder resistor Rb. The voltage sensing circuit 202 is configured to control the switching operation of the switch circuit SW1. The switch circuit SW1 and the voltage sensing circuit 202 constitute an active control circuit 206 for actively manipulating the switch circuit SW1 to turn on or off according to the status of the input AC voltage Vin as to whether the input AC voltage Vin is interrupted, thereby determining if the electric energy of the filtering capacitor Cx is allowable to be discharged through the bleeder resistor Rb.

Figure 3:
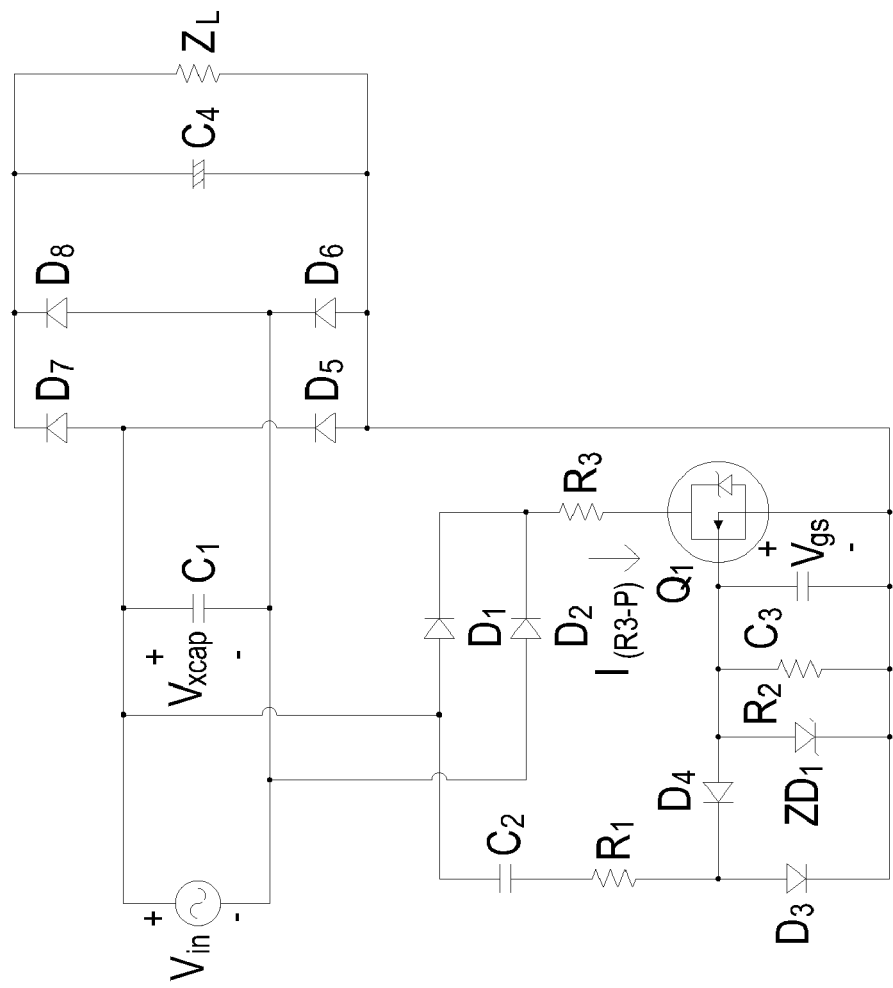
FIG. 3 is a circuit diagram showing a power supply circuit incorporating a discharge loop and an active control circuit for manipulating the discharge loop according to one embodiment of the invention.

FIG. 3 is a circuit diagram showing a power supply circuit according to one embodiment of the invention, in which the filtering capacitor C1 and the bleeder resistor R3 are individually similar to the filtering capacitor Cx and the bleeder resistor Rb of FIG. 2, and it is not intended to give details about the functionality of the filtering capacitor C1 and the bleeder resistor R3 herein. The power supply circuit of FIG. 3 includes a bridge rectifier consisted of rectifying diodes D5-D8 and connected to the input side of the power supply circuit for receiving the input AC voltage Vin and rectifying the input AC voltage Vin into a full-wave rectified DC voltage, in which the input end of the bridge rectifier D5-D8 is connected to the filtering capacitor C1. The full-wave rectified DC voltage outputted from the bridge rectifier D5-D8 is used to power a load $Z_L$. The power supply circuit of FIG. 3 further includes an input bulk capacitor C4 connected in parallel between the positive output terminal and the negative output terminal of the bridge rectifier D5-D8 for removing the high-frequency ripples of the full-wave rectified DC voltage outputted from the bridge rectifier D5-D8. The power supply circuit further includes a reverse current protection circuit (D1, D2) connected between the input side of the power supply circuit and the bleeder resistor R3, i.e. connected in series with the bleeder resistor R3 for prohibiting a reverse current from flowing into the input side of the power supply circuit. The power supply circuit further a differentiator consisted of a resistor R1 and a capacitor C2 and connected to the input side of the power supply circuit for detecting the variation of the input AC voltage Vin. The power supply circuit further includes a half-wave rectifier consisted of rectifying diodes D3 and D4 and connected to the differentiator (R1, C2) and the gate of the switch Q1 for performing half-wave rectification to the detected AC voltage outputted from the differentiator (R1, C2), thereby outputting a half-wave rectified DC voltage. The switch Q1 is driven by the half-wave rectified DC voltage outputted from the half-wave rectifier (D3, D4) to turn on or off. The voltage level of the half-wave rectified DC voltage outputted from the half-wave rectifier (D3, D4) represents the voltage level of the input AC voltage Vin. The power supply circuit further includes a voltage clamp consisted of a zener diode ZD1 connected across the half-wave rectifier (D3, D4) for clamping the voltage level of the half-wave rectified DC voltage outputted from the half-wave rectifier (D3, D4) and protecting the switch Q1 from being damaged as a result of over-voltage conditions. It is noteworthy that the zener diode ZD1 is an optional element. In the instant embodiment, one end of the zener diode ZD1 is connected to the half-wave rectifier and the gate of the switch Q1 and the other end of the zener diode ZD1 is connected to a common ground terminal (the negative output terminal of the bridge rectifier (D5-D8)). The power supply circuit further includes a filter consisted of the resistor R2 and the capacitor C3 and connected in parallel with the voltage clamp ZD1 and connected to the gate of the switch Q1 for removing the noises of half-wave rectified DC voltage outputted from the half-wave rectifier (D3, D4) at an unwanted frequency band, e.g. the AC voltage frequency band over 60 Hz. The power supply circuit further includes a switch Q1 having a drain connected in series with the bleeder resistor R3, a gate connected to the half-wave rectifier (D3, D4), and a source connected to the common ground terminal. The switch Q1 may be implemented by a junction field-effect transistor (JFET), a metal-oxide-semiconductor field-effect transistor (MOSFET), or an isolated gate bipolar transistor (IGBT). The switch Q1 is allowed to be turned off if the driving voltage of the gate of the switch Q1 is a negative voltage. The differentiator (R1, C2), the half-wave rectifier (D3, D4), the filter (R2, C3), and the voltage clamp ZD1 constitute the voltage sensing circuit 202 of FIG. 2. The reverse current protection circuit (D1, D2) is required for proving a discharge path for the bleeder resistor R3 when it is connected to the AC voltage Vin. The switch Q1 constitutes the switch circuit SW1 of FIG. 2. As to the operation of the active control circuit of FIG. 3, it will be elaborated in the following paragraphs.

When the input AC voltage Vin is applying to the power supply circuit, the current flows from the neutral line of the input AC voltage Vin through rectifying diode D8, load $Z_L$, resistor R2, diode D4, resistor R1, and capacitor C2 and then flows back to the fire line of the input AC voltage Vin during the negative half cycle of the input AC voltage Vin. Under this condition, the current will charge the filtering capacitor C3 and thus a negative voltage is generated across the filtering capacitor C3 and filtered by the filtering capacitor C3. Therefore, the gate driving voltage of the switch Q1 is a negative voltage and the switch Q1 is turned off accordingly. Hence, no current will be flowing through the bleeder resistor R3 such that the bleeder resistor R3 will not consume power. The voltage clamp ZD1 can protect the gate of the switch Q1 from being damaged as a result of over-voltage conditions. During the positive half-cycle of the input AC voltage Vin, the capacitor C2 is reset and the current flows from the fire line of the input AC voltage Vin through the capacitor C2, resistor R1, diode D3, rectifying diode D6 and then flows back to the neutral line of the input AC voltage Vin. When the input AC voltage Vin is interrupted, the current flowing through the capacitor C2 is terminated. In the meantime, the gate driving voltage of the switch Q1, i.e. the negative voltage across the filtering capacitor C3 is discharged through the resistor R2 until the negative voltage across the filtering capacitor C3 reaches the threshold voltage of the switch Q1. Under this condition, the switch Q1 is turned on. In the meantime, the filtering capacitor C1 will discharge toward the bleeder resistor R3 through the reverse current protection circuit (D1, D2). Besides, when the filtering capacitor C1 is about to discharge, the voltage across the filtering capacitor C1 can be either a positive voltage or a negative voltage. The polarity of the voltage across the filtering capacitor C1 depending on the phase of the input AC voltage Vin at the time the input AC voltage Vin is interrupted. If the voltage across the filtering capacitor C1 is a positive voltage, the energy stored in the filtering capacitor C1 is discharged through the diode D1, the bleeder resistor R3, the switch Q1, and the rectifying diode D6. If the voltage across the filtering capacitor C1 is a negative voltage, the energy stored in the filtering capacitor C1 is discharged through the diode D2, the bleeder resistor R3, the switch Q1, and the rectifying diode D5.

Figure 4A:
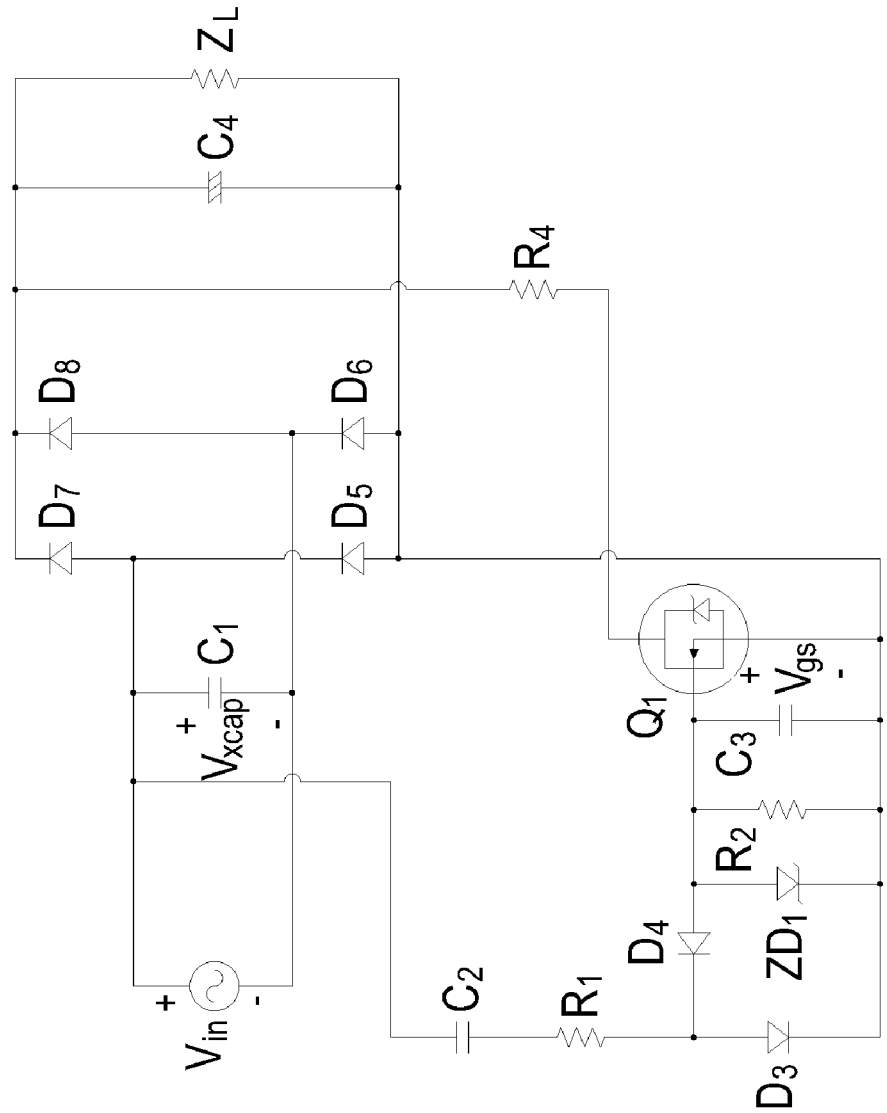
FIG. 4A shows a modification of the circuitry of FIG. 3.

FIG. 4A shows a modification of the circuitry of FIG. 3. Compared to FIG. 3, the circuitry of FIG. 4A removes the reverse current protection circuit (D1, D2), while the bleeder resistor for the filtering capacitor C1 is relocated at the output end of the bridge rectifier D5-D8 instead of the input end of the bridge rectifier D5-D8. As shown, the circuitry of FIG. 4A includes a bleeder resistor R4 located at the output end of the bridge rectifier D5-D8 and connected in parallel with the input bulk capacitor C4 and connected to the drain of the switch Q1. Therefore, the energy stored in the filtering capacitor C1 can be discharged through the rectifying diode D7 or the rectifying diode D8, the bleeder resistor R4, and the switch Q1.

Figure 4B:
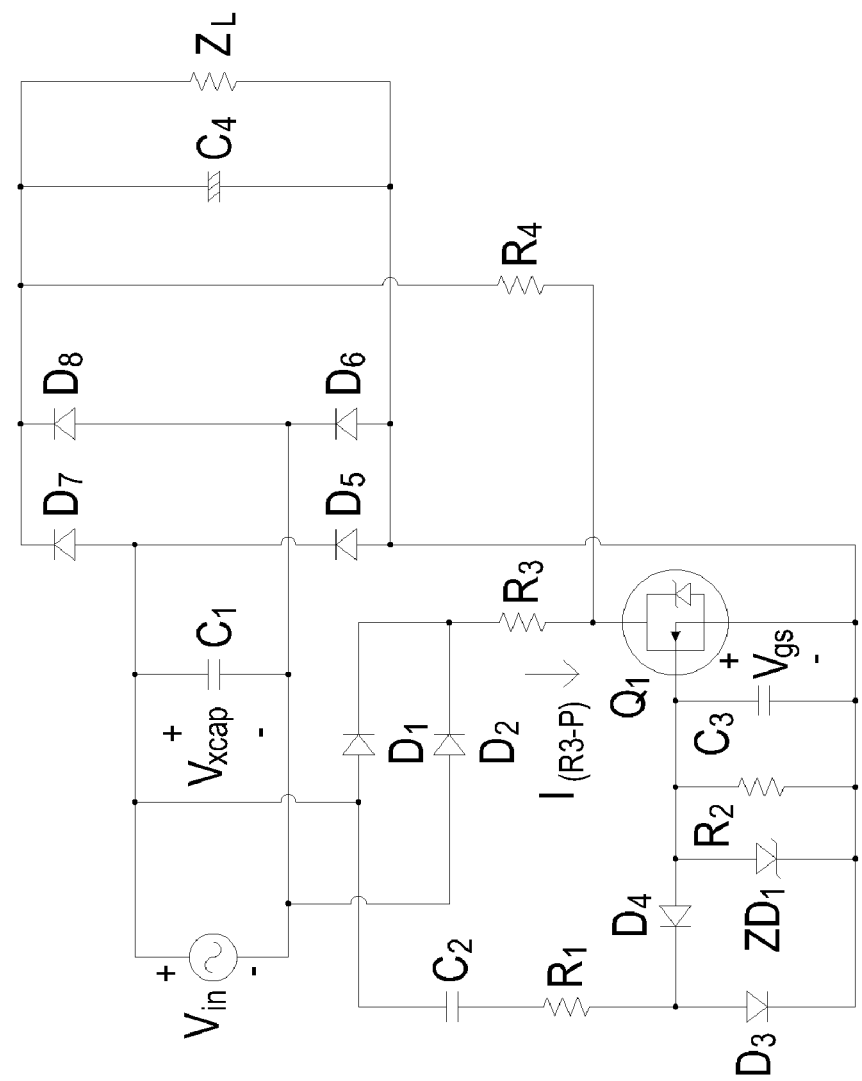
FIG. 4B shows another modification of the circuitry of FIG. 3.

FIG. 4B shows another modification of the circuitry of FIG. 3. Compared to FIG. 3, the circuitry of FIG. 4B adds the bleeder resistor R4 of FIG. 4A located at the output end of bridge rectifier D5-D8 to the circuitry of FIG. 3. As shown, the circuitry of FIG. 4B includes two bleeder resistors R3 and R4. Therefore, the energy stored in the filtering capacitor C1 not only can be discharged through the rectifying diode D7 or the rectifying diode D8, the second bleeder resistor R4, and the switch Q1, but can be discharged through the diode D1 or the diode D2, the first bleeder resistor R3, the switch Q1, and the diode D5 or the diode D6.

Figure 5:
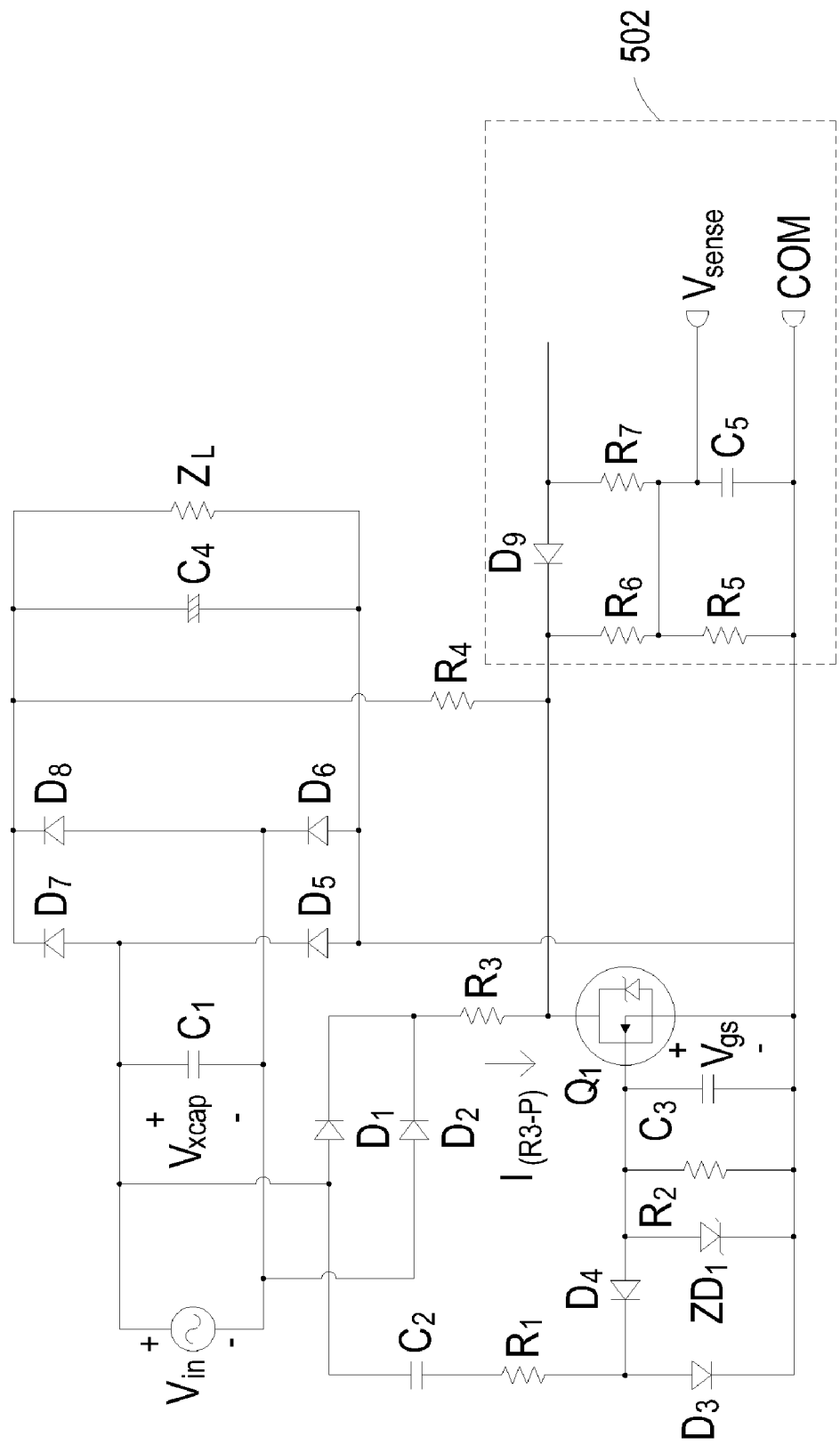
FIG. 5 shows a modification of the circuitry of FIG. 4B.

FIG. 5 shows a modification of the circuitry of FIG. 4B. Compared to FIG. 4B, the circuitry of FIG. 5 adds a monitoring circuit 502 to the circuitry of FIG. 4B for generating a sensed voltage Vsense indicative of the voltage level of the input AC voltage Vin. The monitoring circuit 502 includes a pair of serially-connected resistors R5 and R6 connected between the bleeder resistors R3 and R4 and the common ground terminal COM, and a filter consisted of a resistor R7 and a capacitor C5 and connected in series with the serially-connected resistors R5 and R6. The monitoring circuit 502 further includes a diode D9 connected between the serially-connected resistors R5 and R6 and the filter (R7, C5). The serially-connected resistors R5 and R6 function as a voltage divider being connected to the bleeder resistors R3 and R4 for generating a fractional voltage of the input AC voltage Vin. The fractional voltage generated by serially-connected resistors R5 and R6 is the sensed voltage Vsense indicative of the voltage level of the input AC voltage Vin. If the voltage drop of the bridge rectifier D5-D8 is ignored, the peak voltage of the sensed voltage Vsense can be calculated with the following equation:

$$Vsense = 1.414 \times Vin \times R5/(R3+R6+R5)$$

The sensed voltage Vsense will be provided for the housekeeping circuit (not shown) of the power supply system in order to allow the power supply system to realize the variation of the input AC voltage Vin. The filter (R7, C5) is used to remove the noises of sensed voltage Vsense at an unwanted frequency band, e.g. the AC voltage frequency band over 60 Hz. When the input AC voltage Vin is interrupted, the switch Q1 is turned on and the energy stored in the filtering capacitor C5 can be discharged through the resistor R7, the diode D9, and the switch Q1.

Figure 6:
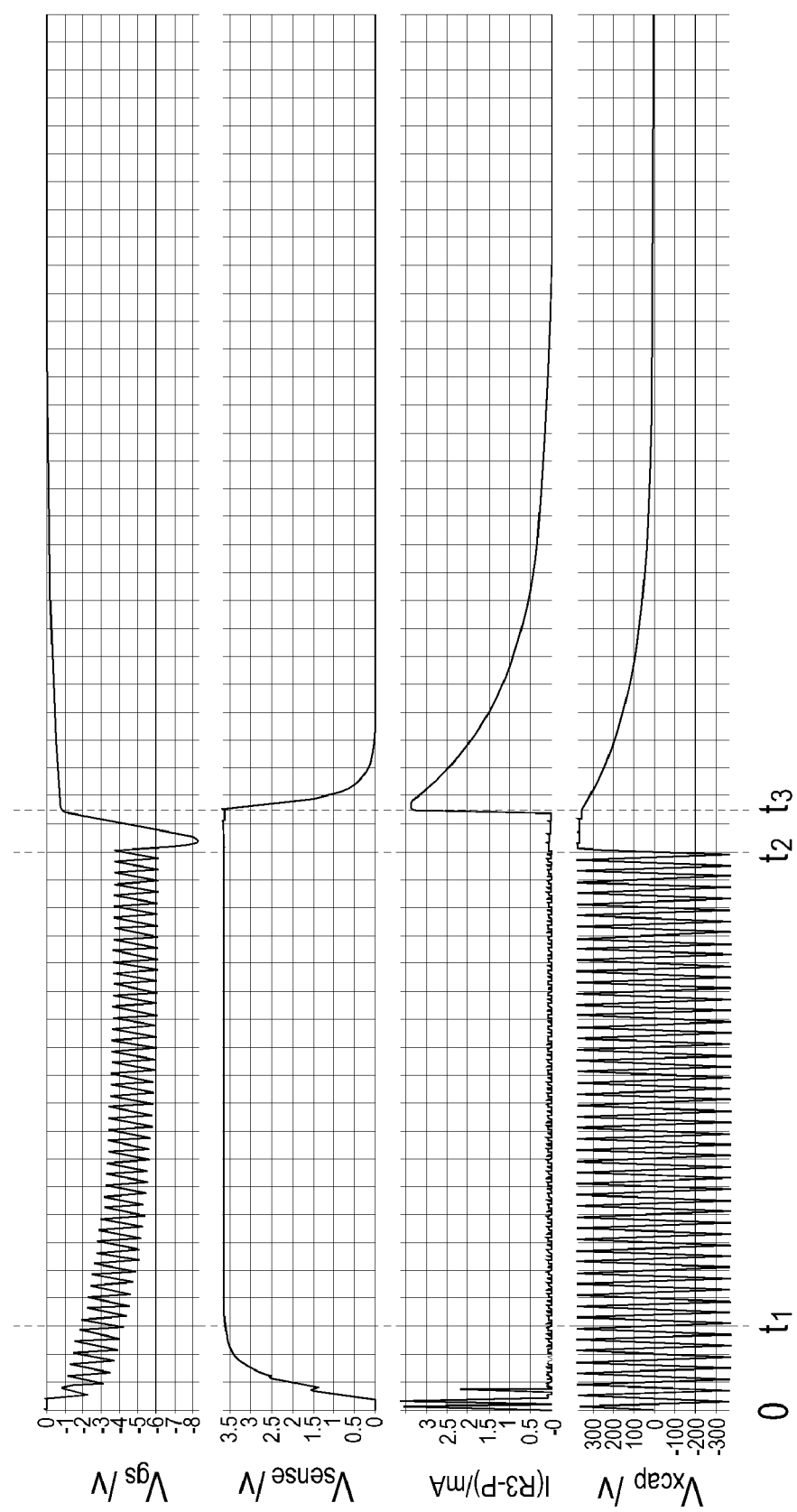
FIG. 6 is a waveform diagram showing the waveforms of the gate-source voltage Vgs of the switch Q1, the sensed voltage Vsense, the discharging current $I_{R3\_P}$ flowing from the filtering capacitor C1 through the bleeder resistor R3, and the voltage Vxcap across the filtering capacitor C1.

FIG. 6 is a waveform diagram showing the waveforms of the gate-source voltage Vgs of the switch Q1, the sensed voltage Vsense, the discharging current $I_{R3-P}$ flowing from the filtering capacitor C1 through the bleeder resistor R3, and the voltage Vxcap across the filtering capacitor C1. Now the operation of the active control circuit of the invention will be further illustrated with reference to FIG. 6. At the time point of 0, the power supply circuit is powered on, and the period of 0-t1 denotes the startup stage of the power supply circuit. During this period, the gate-source voltage Vgs of the switch Q1 gradually declines from 0 to −5V, thereby turning off the switch Q1. The input AC voltage Vin of the power supply circuit gradually increases to its rated voltage level. Therefore, the sensed voltage Vsense will gradually increase to a level indicative of a fractional voltage of the rated level of the input AC voltage Vin. As the switch Q1 is turned off, the filtering capacitor C1 will not discharge through the bleeder resistor R3. Therefore, the discharging current $I_{R3-P}$ of the filtering capacitor C1 is zero. The filtering capacitor C1 is charged by a positive voltage in the positive half-cycle of the input AC voltage Vin and charged by a negative voltage in the negative half-cycle of the input AC voltage Vin. As a result, the voltage Vxcap across the filtering capacitor C1 is wavering between a positive voltage of, e.g. 300V and a negative voltage of, e.g. −300V. The period of t1-t2 denotes the power supplying stage of the power supply circuit. During the period of t1-t2, the input AC voltage Vin has been steadied at its rated level such that the power supply circuit can output a stable and regulated output voltage. During this period, the gate-source voltage Vgs of the switch Q1 is maintained at a level as lower than −6V, and the sensed voltage Vsense is maintained at a stable voltage level. At the time point of t2, the input AC voltage Vin is interrupted. Though the input AC voltage Vin has been interrupted, the level of the input AC voltage Vin will maintained for a while and will start declining at the time point of t3. At the time point of t3, the level of the input AC voltage Vin is declined to zero. In the meantime, the gate-source voltage Vgs of the switch Q1 increases to be higher than the threshold voltage of the switch Q1, thereby turning on the switch Q1. The sensed voltage Vsense is gradually declined to zero. As the switch Q1 is turned on, the filtering capacitor C1 starts the discharging operation through the bleeder resistor R3. Hence, the discharging current $I_{R3-P}$ starts to increase and declines to zero for a while to indicate the end of the discharging operation. Also, the voltage Vxcap of the filtering capacitor C1 will gradually decline to zero.

In conclusion, the invention provides an active control circuit for manipulating the discharge loop in a power supply circuit. The active control circuit is configured to manipulate the discharge loop in a power supply circuit in an active manner that prohibits that bleeder resistor of the power supply circuit from causing power loss as the input AC voltage of the power supply circuit is applying and provides a fast discharge path for the filtering capacitor in the power supply circuit to expedite the discharging operation. Thus, the active control circuit of the invention can lessen the power loss of the circuit and enhance the power efficiency of the circuit.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A discharge loop for a power supply circuit having a filtering capacitor connected to an input side of the power supply circuit for removing electromagnetic interference caused by an input AC voltage, the discharge loop comprising:
   a first bleeder resistor connected to the filtering capacitor for allowing energy stored in the filtering capacitor to be discharged therethrough when the input AC voltage is interrupted; and
   an active control circuit connected to the first bleeder resistor and the input side of the power supply circuit for manipulating the discharge loop according to a status of the input AC voltage to regulate the discharging operation of the energy stored in the filtering capacitor through the first bleeder resistor, the active control circuit comprising:
      a switch connected in series with the first bleeder resistor; and
      a voltage sensing circuit connected to the input side of the power supply circuit and a control terminal of the switch for manipulating the switching operation of the switch, the voltage sensing circuit comprising:
         a differentiator connected to the input side of the power supply circuit for detecting a variation of the input AC voltage; and
         a half-wave rectifier connected to the differentiator and the control terminal of the switch for performing half-wave rectification to the input AC voltage to generate a half-wave rectified DC voltage, thereby driving the switch.

2. The discharge loop according to claim 1 wherein the voltage sensing circuit further includes a reverse current protection circuit connected in series with the first bleeder resistor for prohibiting a reverse current from flowing into the input side of the power supply circuit.

3. The discharge loop according to claim 1 wherein the reverse current protection circuit includes a pair of diodes.

4. The discharge loop according to claim 1 wherein the voltage sensing circuit further includes a voltage clamp having one end connected to the half-wave rectifier and the control terminal of the switch and the other end connected to a common ground terminal for clamping the half-wave rectified DC voltage and protecting the switch from being damaged as a result of over-voltage conditions.

5. The discharge loop according to claim 4 wherein the voltage clamp includes a zener diode.

6. The discharge loop according to claim 1 wherein the voltage sensing circuit further includes a filter connected to the control terminal of the switch for removing noises from the half-wave rectified DC voltage.

7. The discharge loop according to claim 6 wherein the filter includes a resistor and a capacitor.

8. The discharge loop according to claim 1 wherein the power supply circuit further includes a bridge rectifier connected to the input side of the power supply circuit, and the first bleeder resistor is located at an input end of the bridge rectifier.

9. The discharge loop according to claim 8 further comprising a second bleeder resistor located at an output end of the bridge rectifier.

10. The discharge loop according to claim 9 further comprising a monitoring circuit connected in series with the second bleeder resistor and connected to the switch for sensing the input AC voltage and generating a sensed voltage indicative of a voltage level of the input AC voltage accordingly.

11. The discharge loop according to claim 10 wherein the monitoring circuit includes:
   a voltage divider connected to the first bleeder resistor and the second bleeder resistor for generating a fractional voltage indicative of a fraction of the input AC voltage;
   a filter connected to the voltage divider for removing noises from the fractional voltage; and
   a diode connected between the voltage divider and the filter.

12. The discharge loop according to claim 1 wherein the power supply circuit further includes a bridge rectifier connected to the input side of the power supply circuit, and the first bleeder resistor is located at an output end of the bridge rectifier.

13. The discharge loop according to claim 1 wherein the switch comprises a junction field-effect transistor, a metal-oxide-semiconductor field-effect transistor, or an isolated gate bipolar transistor.

14. An active control circuit for use with a discharge loop in a power supply circuit, wherein the power supply circuit comprises a filtering capacitor connected to an input side of the power supply circuit for removing electromagnetic interference caused by an input AC voltage and the discharge loop comprises a first bleeder resistor connected to the filtering capacitor for allowing the energy stored in the filtering capacitor to be discharged therethrough as the input AC voltage is interrupted, the active control circuit comprising:
   a switch connected in series with the first bleeder resistor; and
   a voltage sensing circuit connected to the input side of the power supply circuit and a control terminal of the switch for manipulate the switching operation of the switch, the voltage sensing circuit comprising:
      a differentiator connected to the input side of the power supply circuit for detecting variations of the input AC voltage;
      a half-wave rectifier connected to the differentiator and the control terminal of the switch for performing half-wave rectification to the input AC voltage to generate a half-wave rectified DC voltage, thereby driving the switch; and
      a filter connected to the control terminal of the switch for removing noises from the half-wave rectified DC voltage.

15. The active control circuit according to claim 14 wherein the voltage sensing circuit further includes a reverse current protection circuit comprising a pair of diodes and connected in series with the first bleeder for prohibiting a reverse current from flowing into the input side of the power supply circuit.

16. The active control circuit according to claim 14 wherein the voltage sensing circuit further includes a voltage clamp comprising a zener diode having one end connected to the half-wave rectifier and the control terminal of the switch and the other end connected to a common ground terminal for clamping the half-wave rectified DC voltage and protecting the switch from being damaged as a result of over-voltage conditions.

* * * * *